United States Patent

Tewksbury, Jr. et al.

[15] 3,673,178
[45] June 27, 1972

[54] PROCESS FOR PREPARING 2-[2-(ARYLAMINO)-VINYL]-1-(LOWER ALKYL)-3-H-INDOLIUM SALT DYES

[72] Inventors: Floyd L. Tewksbury, Jr., Eggertsville; Walter R. Demler, Hamburg, both of N.Y.

[73] Assignee: Allied Chemical Corporation, New York, N.Y.

[22] Filed: Nov. 14, 1969

[21] Appl. No.: 877,033

[52] U.S. Cl. ........................................... 260/240.8
[51] Int. Cl. ........................................... C07d 27/38
[58] Field of Search ............................... 260/240.8

[56] References Cited

UNITED STATES PATENTS 2,077,063  4/1937  Wolff ........................... 260/38
2,155,459  4/1939  Winter et al. .................. 260/240

FOREIGN PATENTS OR APPLICATIONS 789,310  1/1958  Great Britain ..................... 260/252

OTHER PUBLICATIONS

Fritz et al., Ann. 664, 188– 205 (1963).

*Primary Examiner*—Henry R. Jiles
*Assistant Examiner*—G. Thomas Todd
*Attorney*—Jay P. Friedenson

[57] ABSTRACT

Production of water-soluble cationic dyes by reaction of 1-lower alkyl-$\Delta^{2,}$-indolineacetaldehydes, primary and secondary aromatic amines and orthophosphoric acid in an inert water-miscible organic solvent. This improved process provides a substantially quantitative product yield while avoiding addition of dye-precipitating agent to the reaction mass.

16 Claims, No Drawings

3,673,178

PROCESS FOR PREPARING 2-[2-(ARYLAMINO)-VINYL]-1-(LOWER ALKYL)-3-H-INDOLIUM SALT DYES

BACKGROUND OF THE INVENTION

The present invention relates to improvements in the preparation of water-soluble cationic dyestuffs. More particularly it relates to an improved process of preparing water-soluble 2-[2-(arylamino)vinyl]-1-(lower alkyl)-3-H-indolium salt dyes. It is especially concerned with an improvement in the preparation of such dyes wherein the arylamino radical is devoid of chromophoric substituents attached to the aryl nucleus.

DESCRIPTION OF THE PRIOR ART

Water-soluble 2-[2-(arylamino)vinyl]-1-(lower alkyl)-3-H-indolium salts wherein the arylamino radical is devoid of chromophoric substituents attached to the aryl nucleus, are commercially important yellow dyes for polyacrylonitrile, viscose as described in U.S. Pat. No. 3,113,825 and aluminum-containing metals as disclosed in U.S. Pat. No. 2,989,427. According to U.S. Pat. No. 2,155,459 these valuable dyestuffs are prepared in water by reaction of an acid, a 1-(lower alkyl)-$\Delta^{2,\alpha}$-indoline acetaldehyde and a primary or secondary aromatic amine devoid of chromophoric substituents. The product obtained by this condensation is contaminated with a red impurity as is illustrated by Example 15 below. Removal of this impurity involves costly recrystallization of the dyestuff. It is also known to effect the condensation reaction in a water-immiscible solvent such as benzene as taught in U.S. Pat. No. 2,077,063 and Example 5 of U.S. Pat. No. 2,155,459. However, this procedure requires the removal of the solvent by steam-distillation prior to recovery of the product.

Prior art attempts to prepare the present dyestuffs by condensing amine, aldehyde, and acid in a water-miscible organic solvent result in a relatively poor product yield or necessitate the addition of a salt to precipitate the dyestuff from the condensation mass. Thus H. Fritz et al., Ann.664 188 (1963) obtain only about a 59 percent yield of 2-[2-(anilino)vinyl]-1,3,3-trimethyl-2-H-indolium perchlorate by condensation of the corresponding indolineacetaldehyde, aniline and perchloric acid in methanol. Alternatively K. Obayashi et al., [Jap. Pat. 27, 121 (1964), C.A. 62 11949c (1965)] effect the condensation employing acetic acid as both reaction solvent and acid reactant. However, as is illustrated in Example 14 below, the reference product does not precipitate from the condensation mass. Isolation of the product according to the reference process entails addition of water and salt.

It is the object of the present invention to devise an improved process for preparing water-soluble 2-[2-(arylamino)-vinyl]-1-(lower alkyl)-3-H-indolium salt dyes wherein the aryl amino radical is devoid of chromophoric substituents attached to the aromatic nucleus.

This and other objects and advantages will be apparent from the following description of our invention.

SUMMARY OF THE INVENTION

The aforementioned disadvantages of the prior art dyestuff preparations are overcome and the above object is attained according to the invention by an improvement in the reaction of 1-lower alkyl-$\Delta^{2,\alpha}$-indolineacetaldehydes, primary and secondary aromatic amines devoid of chromophoric substituents and mineral acid which consists in carrying out the reaction in the presence of orthophosphoric acid as the mineral acid reactant and an inert water miscible organic solvent.

Surprisingly, the present process provides a dyestuff product which precipitates in a substantially quantitative yield, corresponding to at least about an 85 percent yield of theory, from the condensation mass without addition of a precipitating agent such as salt. Unexpectedly also, the product of the present process is substantially free of the red impurity which contaminates the dyestuff when the latter is prepared in aqueous media.

DETAILED DESCRIPTION OF THE INVENTION

The present improved condensation is conveniently carried out by dissolving the aldehyde and the amine in the solvent at ambient temperature, in other words at about 15°–25° C. If necessary the resultant mass is filtered to remove any insolubles prior to charging the acid and commencing the condensation reaction. The reaction temperature and duration of the condensation is essentially conventional, i.e., the reaction is carried out for about 0.5 to 16 hours or longer at temperatures in the range of from about ambient temperature to the reflux temperature of the solvent in the reaction mass. On completion of the reaction, the condensation mass is filtered or centrifuged at ambient temperature to recover the precipitated cationic dye. The collected product is washed with solvent and dried in a conventional manner.

The proportions of the reactants charged are conventional in this art. Advantageously, the aldehyde and amine are charged in about equimolar proportions. If desired, either organic reactant can be charged in excess, e.g. as much as about 40 mol percent over the other organic reactant. At least about 1 mol of orthophosphoric acid is charged per mol of yield-limiting organic reactant, the yield-limiting organic reactant being defined as the organic reactant not charged in excess. Advantageously, about 1 to 4 mols and especially about 1 to 2 mols, of orthophosphoric acid are employed. Use of more than about 9 mols of orthophosphoric acid, while effective, is wasteful and hence is to be avoided.

The amount of solvent charged in the practice of our invention will vary somewhat depending upon the particular organic reactants and solvent employed. Preferably, however, we employ sufficient solvent to provide a weight ratio of solvent to reactants of at least about 1:1 and still preferably between about 1.2:1 to 2.5:1. A particularly good result is achieved according to the invention in charging between about 1.5 to 2.0 parts solvent per part by weight of the reactant mixture. Use of more than about 4.5 parts solvent per part by weight of the reactant mixture, while effective, is wasteful of solvent and hence is to be avoided.

The instant process can be effected in the presence of as much as about 40 weight percent water based on the weight of amine-aldehyde-acid mixture. Hence the presence of minor amounts of water in the solvent or reactants charged, such as the 15 weight percent water present in commercial concentrated orthophosphoric acid, is not detrimental to the operation of the present process. When water is present in the reaction mixture, at least some of the orthophosphoric acid may be replaced by phosphoric acid anhydride since the water and anhydride react to form orthophosphoric acid in situ.

Solvents suitable for use in the present novel process are inert, water-miscible organic solvents. The preferred solvents are aliphatic and cycloaliphatic ketones, ethers and monohydric alcohols of one to six carbon atoms which are water-miscible. By water-miscible, we mean miscible with water to the extent of dissolving at least about five weight percent water at about ambient temperature. Solvents useful in the practice of the invention are chemically inert to the reactants and products of our novel process. Typical suitable solvents include the following representative examples:

Alcohols:
    3-methyl 3-pentanol
    3,3-dimethyl 2-butanol
    3-methyl 2-pentanol
    2-hexanol
    1-pentanol
    2-pentanol
    2-methyl 1-butanol
    2,2-dimethyl 1-propanol
    2-methyl 2-butanol
    1-butanol (n-butyl alcohol)
    cyclobutanol
    2-methyl 1-propanol (isobutyl alcohol)
    2-butanol (sec.-butyl alcohol)
    2-methyl 2-propanol (tert.-butyl alcohol)
    1-propanol 2-propanol
1,1,1,3,3,3-hexafluoro-2-propanol
ethanol
methanol Ketones:
acetone
methyl ethyl ketone Ethers:
dioxane
2-ethoxyethyl acetate
tetrahydrofuran
1-methyl tetrahydrofuran In this respect also, there can be used mixtures of these and equivalent water-miscible lower aliphatic and cycloaliphatic ketones, ethers and monohydric alcohols including derivatives thereof containing conventional, inert substituents such as halogen, lower alkoxy, lower acyloxy and the like.

Preferably we employ a lower aliphatic ketone, ether or monohydric alcohol which is completely miscible with water in all proportions at ambient temperature. An especially good result is achieved according to the invention in employing a monohydric alcohol of one to three carbon atoms, e.g. ethanol.

Suitable $\Delta^{2,\alpha}$-indolineacetaldehydes for use in the present process contain a 1-lower alkyl substituent, in other words, an alkyl radical of one to six carbon atoms attached to the nitrogen of the indoline nucleus. The aldehyde reactant of the invention can also contain in addition to hydrogen conventional substituents such as lower alkoxy, lower alkyl, nitro, halogen, cyano, phenyl and the like. Desirably the indoline-aldehyde is devoid of acidic substituents such as sulfonic acid and carboxylic acid radicals. Typical examples of suitable indolinealdehydes include the following representative examples:

1-methyl-$\Delta^{2,\alpha}$-indolineacetaldehyde
1,3-dimethyl-$\Delta^{2,\alpha}$-indolineacetaldehyde
1-n-hexyl-$\Delta^{2,\alpha}$-indolineacetaldehyde
1,3,3-trimethyl-$\Delta^{2,\alpha}$-indolineacetaldehyde
1,3,3-triethyl-$\Delta^{2,\alpha}$-indolineacetaldehyde
5-methoxy-1,3,3-trimethyl-$\Delta^{2,\alpha}$-indolineacetaldehyde
4-methyl-1,3,3-trimethyl-$\Delta^{2,\alpha}$-indolineacetaldehyde
5-chloro-1,3,3-tris(n-butyl)-$\Delta^{2,\alpha}$-indolineacetaldehyde
5-cyano-1,3,3-tris(n-butyl)-$\Delta^{2,\alpha}$-indolineacetaldehyde
1-methyl,3,3-diethyl-$\Delta^{2,\alpha}$-indolineacetaldehyde.

Preferable a 1,3,3-tris(lower alkyl)-$\Delta^{2,\alpha}$-indolineacetaldehyde and especially the readily available 1,3,3-trimethyl-$\Delta^{2,\alpha}$-indolineacetaldehyde ("Fishcher's Aldehyde") is employed in the present process.

The aromatic amine charged in the present process is a primary or secondary amine of the benzene or naphthalene series. The amine should be devoid of chromophoric substituents, such as the azophenyl radical, attached to aryl nucleus. Arylamines containing chromophoric substituents react with the aldehydes and acid of the invention to yield dyes which change color on change of pH. The aromatic amine reactant can contain substituents of the type disclosed above for the aldehyde reactant. Advantageously the aromatic amine is devoid of sulfonic acid and other acidic substituents. Heterocyclic secondary aromatic amines wherein the amino group is a member of a saturated ring fused to the aromatic nucleus can be employed also. Typical suitable aromatic amines include the following representative examples:

aniline
N-methyl aniline
N-(n-hexyl) aniline
diphenylamine
p-phenylenediamine
o-, m- and p-anisidines
o-, m- and p-chloroanilines
2,4-dimethoxyaniline
2,4-di-n-butylaniline
2,3-dihydroindole
1,2,3,4-tetrahydroquinoline
2,3-dihydro-2-phenylindole
o-, m- and p-toluidine
p-tert. butyl aniline
2-methyl 4-methoxyaniline
1-aminonaphthalene
p-nitroaniline
4-aminobiphenyl.

These and equivalent aromatic amines such as those listed in U.S. Pat. Nos. 2,077,063 and 2,155,459 which are incorporated herein as references can be employed in the practice of the invention.

Preferably a primary aromatic amine of the benzene series is employed. Lower alkoxy anilines, e.g. p-anisidine and 2,4-dimethoxy aniline, provide especially good results.

The improved condensation provides 2-[2-(arylamino) vinyl]-1-lower alkyl-3-H-indolium dihydrogen phosphates and the phosphoric acid salts thereof. According to the invention, the former type of salt is obtained with use of a stoichiometric proportion of orthophosphoric acid whereas the latter type of salt is obtained when an excess of the acid is charged. Both types of product obtained in accordance with the invention have exceptionally good water solubility. The dyestuffs obtained in accordance with the invention are substantially free of the aforementioned red impurity which deleteriously affects the shade of these dyestuffs. Compared to prior art attempts to prepare similar dyes in water-miscible organic solvents the present condensation affords substantially greater product yields.

As an additional practical advantage of our process, the solubility of the amine and aldehyde reactants in the indicated solvents permits the facile removal of insolubles from these reactants prior to commencement of the condensation.

In the following examples which serve to illustrate our invention, parts percentages and proportions are by weight unless otherwise noted and temperatures are in degrees centigrade.

EXAMPLE 1

A mixture of 112.8 parts of moist 1,3,3-trimethyl$\Delta^{2,\alpha}$-indolineacetaldehyde (containing 32 parts water and about 80.8 parts, 0.40 mol, of the aldehyde) 246 parts 92.4 percent aqueous ethanol (aqueous 95 percent by volume ethanol) and 49.2 parts (0.40 mol) p-anisidine is agitated at ambient temperature for about 15 minutes. The mixture is filtered to remove traces of insoluble organic impurities which are washed with about 80.4 parts of 92.4 percent aqueous ethanol. After addition of the alcoholic washings to the filtrate, the latter is heated to about 65° over a period of 30 minutes. Over a period of about 30 minutes, about 55 parts of 85 percent aqueous orthophosphoric acid (containing 46.7 parts, 0.48 mol orthophosphoric acid) is added dropwise to the mixture which is maintained at about 65°–70° during the addition. On completion of the addition, the condensation mass is heated to reflux (about 80°) over a period of about 30 minutes and refluxed for about 1 hour. The reaction mass is allowed to cool to ambient temperature. The resultant slurry is filtered, the collected product is washed with about 322 parts 92.4 percent aqueous ethanol, and dried at 55°–60° under a current of air. The combined filtrate and washings (about 740 parts by volume) are reserved for recovery of the alcohol by distillation. The product 2-[2-(p-anisidino) vinyl]-1,3,3-trimethyl-3-H-indolium dihydrogen phosphate of the following structure:

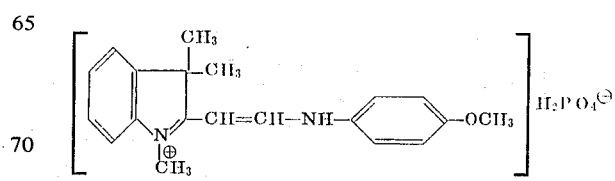

(163.5 parts corresponding to about 100 percent theory yield) has excellent solubility in water and dyes polyacrylonitrile fiber in excellent greenish yellow shades.

EXAMPLE 2

About 112.8 parts moist 1,3,3-Δ²,α-indolineacetaldehyde (containing about 32 parts water, and about 80.8, 0.40 mol, of the aldehyde), 61.2 parts (0.40 mol) molten 2,4-dimethoxyaniline are agitated at ambient temperature for 15 minutes in 406 parts 92.4 percent aqueous ethanol and filtered. The collected impurities are washed with about 80.4 parts 92.4 percent aqueous ethanol and the washings are combined with the filtrate. Following the procedure of Example 1, the resultant alcoholic mass is treated with 154 parts 85 percent aqueous orthophosphoric acid (containing 131 parts, 1.34 mol, of the acid). The dried recovered dyestuff is the orthophosphoric acid salt of 2-[2,4-dimethoxyanilino) vinyl]-1,3,3-trimethyl-3-H-indolium dihydrogen phosphate corresponding to the structural formula:

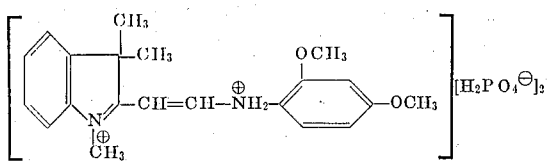

The dyestuff (182.2 parts, 85.6 percent yield of theory) gives excellent greenish yellow dyeings on polyacrylonitrile fibers.

EXAMPLE 3

By a procedure similar to that of Example 1, 41.9 parts (0.21 mol) anhydrous 1,3,3-trimethylΔ²,α-indolineacetaldehyde is condensed with about 30 parts (0.24 mol) p-anisidine in 198 parts methanol employing about 102.8 parts 85 percent aqueous orthophosphoric acid (containing 87.2 parts, 0.89 mol, of the acid). The condensation mass is refluxed at about 70° for 2 hours. The resultant mass is allowed to stand at ambient temperature for about 16 hours and is then filtered to collect the precipitated product. The recovered product is washed with about 396 parts methanol and dried at 55°. The resultant dyestuff is the orthophosphoric salt of the dyestuff of Example 1 corresponding to the structural formula:

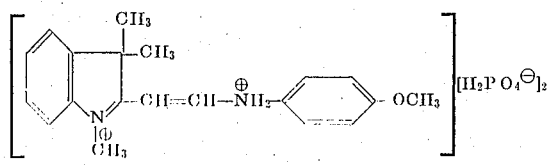

The product (92 parts 87 percent yield of theory, based on the aldehyde charged) dyes polyacrylonitrile in excellent greenish yellow shades.

EXAMPLES 4-9

In the following Examples 4-9 which are summarized in the Table below, various water-miscible ketonic, etheric and alcoholic solvents are employed in the preparation of the dyestuff of Example 3 according to this invention. The procedure of these examples is substantially that of Example 3 employing a solution of 10.1 parts (0.05 mol) of anhydrous 1,3,3-Δ²,α-indolineacetaldehyde, 6.2 parts (0.0504 mol) of p-anisidine in 150 parts by volume of the solvent and 51.3 parts of 85 percent aqueous orthophosphoric acid (43.6 parts, 0.445 mol, of the acid) which is charged as a solution in about 30 parts by volume of the solvent. The acid is added over a period of about 10 minutes to the reaction mixture which is maintained at the temperature indicated on column 4 of the table. After addition of the phosphoric acid, each mixture is heated for about 1 hour at the temperature listed in column 5 of the Table. About 200 parts by volume solvent is employed in washing the recovered product which is dried in vacuo at about 40°–50°.

TABLE

| Example | Reaction solvent charged* | Temperature of the condensation mixture during acid addition | Temperature at which condensation mass is heated after addition of acid | Yield of dyestuff** |
|---|---|---|---|---|
| 4 | 167.6 parts acetone | 50° | ¹70° | 21.9 parts (87.6% of theory). |
| 5 | 175.5 parts 2-ethoxyethyl acetate | 70° | 80-85° | Substantially quantitative. |
| 6 | 144.8 parts n-propanol | 70° | 80-85° | 23.2 parts (91.8% of theory). |
| 7 | 145.8 parts n-butanol | 70° | 80-85° | 24.5 parts (97% of theory). |
| 8 | 145.3 parts sec. butanol | 70° | 80-85° | 24.1 parts (95.2% of theory). |
| 9 | 140.2 parts tert.butanol | 70° | 80-85° | 23.7 parts (93.7% of theory). |

¹ At reflux.
* The amounts of solvent include the solvent charged with the phosphoric acid.
** The percent yield of theory is based on the p-anisidine charged.

EXAMPLE 10

The procedure of Example 4 is repeated substantially as described except that 92.4 percent aqueous ethanol is employed as solvent and 6.4 parts (0.502 mol) of p-chloroaniline is charged instead of p-anisidine. There is obtained an excellent yield of yellow dyestuff, the orthophosphoric acid salt of 2-[2-(p-chloro-anilino)vinyl]-1,3,3-trimethyl-3-H-indolium dihydrogen phosphate of the structural formula:

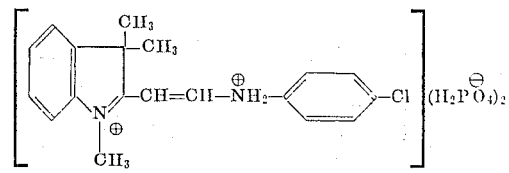

EXAMPLE 11

The procedure of Example 4 is repeated substantially as described in condensing at reflux 102.5 parts 98 percent commercial 1,3,3-trimethylΔ²,α-indolineacetaldehyde (containing 100.5 parts, 0.5 mol, of the pure aldehyde), 60 parts (0.503 mol) 2,3-dihydroindole and 257 parts 85 percent aqueous orthophosphoric acid (containing 218 parts, 2.23 mol, of the acid) employing 1430 parts anhydrous ethanol as reaction solvent. There is obtained a substantially quantitative yield of a bright greenish yellow dye corresponding to the structural formula:

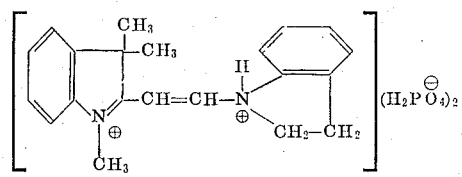

EXAMPLE 12

The procedure of Example 6 is repeated substantially as described except that 6.7 parts (0.0503 mol) 1,2,3,4 tetrahydroquinoline and 141 parts isopropanol are charged instead of p-anisidine and n-propanol, respectively and the condensation mass is refluxed for about 2.5 hours. There is obtained an excellent yield of yellow dyestuff corresponding to the structural formula:

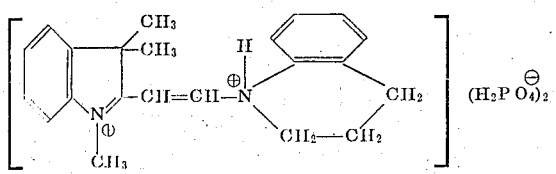

The following two comparative examples illustrate the disadvantages of acids other than orthophosphoric acid in preparing dyestuffs according to the invention.

EXAMPLE 13

By a procedure analogous to that of Example 3, 48.7 parts of 20° Be' aqueous hydrochloric acid (containing 15.3 parts, 0.42 mol, hydrogen chloride) is charged to a mixture of 41.9 parts (0.21 mol) 1,3,3-trimethyl-$\Delta^{2,\alpha}$-indolineacetaldehyde and 25.2 parts (0.21 mol) p-anisidine (which has been dissolved at ambient temperature in 201 parts 92.4 percent aqueous ethanol and heated to 60°). The mass is refluxed for 2 hours and allowed to stand at ambient temperature for about 16 hours. The reaction product is a clear solution, i.e. it contains no solid product which can be recovered by filtration.

EXAMPLE 14

The procedure of Japanese Pat. No. 27,121(1964), C.A. 62 11949d (1965); is repeated substantially as described in condensing 1,3,3-trimethyl-$\Delta^{2,\alpha}$-indolineacetaldehyde and p-anisidine in glacial acetic acid. The mixture of amine aldehyde and glacial acetic acid after being maintained at 25° for about 18 hours yields a solution containing no solid product.

The following comparative example illustrates the contaminated product obtained on preparing the present dyestuffs in water.

EXAMPLE 15

A mixture of 6.15 parts (0.05 mol) p-anisidine, 24.8 parts 85 percent aqueous orthophosphoric acid (containing about 21 parts, 0.215 mol, of the acid) and about 200 parts water is heated to 50°–55° and filtered. About 10.3 parts (0.051 mol) of 1,3,3-trimethyl$\Delta^{2,\alpha}$-indolineacetaldehyde are charged to the aqueous filtrate which is agitated for about 16 hours at ambient temperature. The condensation mass is filtered to collect product which is washed with about 100 parts by volume of 4 percent aqueous sodium dihydrogen phosphate and dried in vacuo at 40°–50°. There is obtained about 21.1 parts of the dyestuff of Example 3 which contains a substantial amount of a red impurity as indicated by paper chromatographic analysis. (The same dyestuff prepared in accordance with the invention is devoid of this impurity as analyzed by paper chromatography.) The product provides a polyacrylonitrile dyeing of unattractive reddish yellow shade compared to a similar greenish yellow coloration of the dyestuff prepared in accordance with the invention.

We claim:

1. In the process of preparing water-soluble 2-[2-(arylamino)vinyl]-1-lower alkyl-3-H indolium salt dyestuffs by reaction of mineral acid, 1-lower alkyl-$\Delta^{2,\alpha}$-indolineacetaldehyde and primary and secondary aromatic amines devoid of chromophoric substituents, the improvement which consists in carrying out the reaction in the presence of orthophosphoric acid as the mineral acid and an inert water-miscible organic solvent.

2. The process as defined in claim 1 wherein the water-miscible organic solvent is selected from lower aliphatic and cycloaliphatic ketones, ethers, and monohydric alcohols.

3. The process as defined in claim 2 wherein said 1-lower alkyl-$\Delta^{2,\alpha}$-indolineacetaldehyde is 1,3,3-tris(lower alkyl)$\Delta^{2,\alpha}$-indolineacetaldehyde.

4. The process as defined in claim 2 wherein said 1,3,3-tris(lower alkyl)-$\Delta^{2,\alpha}$-indolineacetaldehyde is 1,3,3-trimethyl-$\Delta^{2,\alpha}$-indolineacetaldehyde.

5. The process as defined in claim 2 wherein said aromatic amine is a primary aromatic amine.

6. The process as defined in claim 2 wherein said aromatic amine is of the benzene series.

7. The process as defined in claim 2 wherein said reaction solvent is miscible with water in all proportions.

8. The process as defined in claim 7 wherein said reaction solvent is a lower aliphatic monohydric alcohol of one to three carbon atoms.

9. The process as defined in claim 2 wherein the weight ratio of said reaction solvent to reactants is at least about 1:1.

10. The process as defined in claim 9 wherein said weight ratio is from about 1.2:1 to 2.5:1.

11. The process as defined in claim 4 wherein the aromatic amine is p-anisidine,, the reaction solvent is ethanol, and the weight ratio of said ethanol to the reactants is at least about 1:1.

12. The process as defined in claim 4 wherein said aromatic amine is 2,4 dimethoxyaniline, the reaction solvent is ethanol and the weight ratio of said ethanol to the reactants is at least about 1:1.

13. The process as defined in claim 4 wherein said aromatic amine is p-chloroaniline, the reaction solvent is ethanol, and the weight ratio of said ethanol to the reactants is at least about 1:1.

14. The process as defined in claim 4 wherein said aromatic amine is 2,3-dihydroindole, the reaction solvent is anhydrous ethanol, and the weight ratio of ethanol to the reactants is at least about 1:1.

15. The process as defined in claim 4 wherein said aromatic amine is 1,2,3,4-tetrahydroquinoline, the reaction solvent is isopropanol, and the weight ratio of isopropanol to the reactants is at least about 1:1.

16. The process as defined in claim 2 in which the orthophosphoric acid is aqueous 85 weight percent orthophosphoric acid.

* * * * *